US009069584B2

(12) United States Patent
Shelansky et al.

(10) Patent No.: US 9,069,584 B2
(45) Date of Patent: Jun. 30, 2015

(54) MULTI-PLATFORM APPLICATION PLAYER

(75) Inventors: Andrew R. Shelansky, Irvine, CA (US);
Shiang-Feng Lee, Irvine, CA (US);
Fabio Gava, Ladera Ranch, CA (US);
Daniel P. Gicklhorn, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 324 days.

(21) Appl. No.: 13/095,538

(22) Filed: Apr. 27, 2011

(65) Prior Publication Data

US 2012/0066675 A1    Mar. 15, 2012

Related U.S. Application Data

(60) Provisional application No. 61/382,445, filed on Sep. 13, 2010.

(51) Int. Cl.
G06F 9/445    (2006.01)

(52) U.S. Cl.
CPC .............. *G06F 9/44526* (2013.01); *G06F 8/65* (2013.01); *G06F 8/60* (2013.01); *G06F 9/44521* (2013.01)

(58) Field of Classification Search
CPC ......... G06F 8/61; G06F 8/65; G06F 9/44521; G06F 9/44526
USPC ........................... 717/168, 169, 170, 172, 178
See application file for complete search history.

(56) References Cited

U.S. PATENT DOCUMENTS

| 6,578,142 | B1* | 6/2003 | Anderson et al. ................ 713/2 |
| 7,523,116 | B2* | 4/2009 | Yan ........................................ 1/1 |
| 2005/0064860 | A1* | 3/2005 | DeLine ........................ 455/420 |
| 2005/0289264 | A1* | 12/2005 | Illowsky et al. .............. 710/104 |
| 2006/0048141 | A1* | 3/2006 | Persson et al. ................ 717/176 |
| 2006/0218536 | A1* | 9/2006 | Kirilline et al. ............... 717/127 |
| 2008/0139112 | A1* | 6/2008 | Sampath et al. ............. 455/3.04 |
| 2010/0313196 | A1* | 12/2010 | De Atley et al. ............. 717/174 |
| 2011/0035742 | A1* | 2/2011 | Shenfield ....................... 717/171 |

* cited by examiner

*Primary Examiner* — Wei Zhen
*Assistant Examiner* — Brahim Bourzik
(74) *Attorney, Agent, or Firm* — Sherman IP LLP; Kenneth L. Sherman; Steven Laut

(57) ABSTRACT

In a first embodiment of the present invention, a method for operating a multi-platform application player on a device is provided, comprising: receiving an indication of a first application to run on the device; determining a platform required for the first application to run; identifying a first application player suitable for running an environment compatible with the determined platform, wherein the first application player is capable of running the first application as well as one or more other applications created for the determined platform; loading the first application player in the multi-platform application player; and running the first application in the first application player in the multi-platform application player on the device.

28 Claims, 18 Drawing Sheets

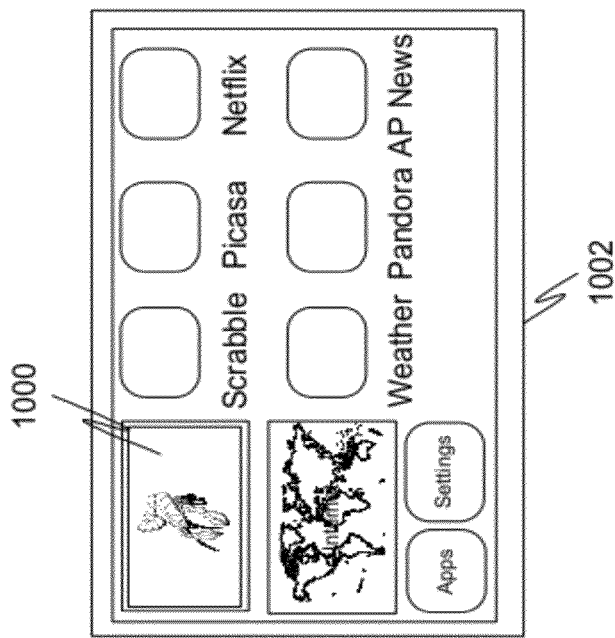
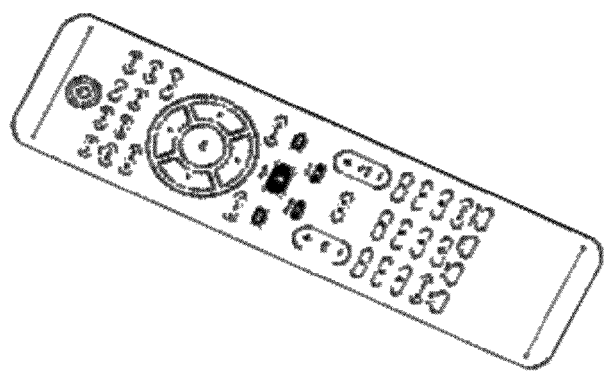
FIG. 11

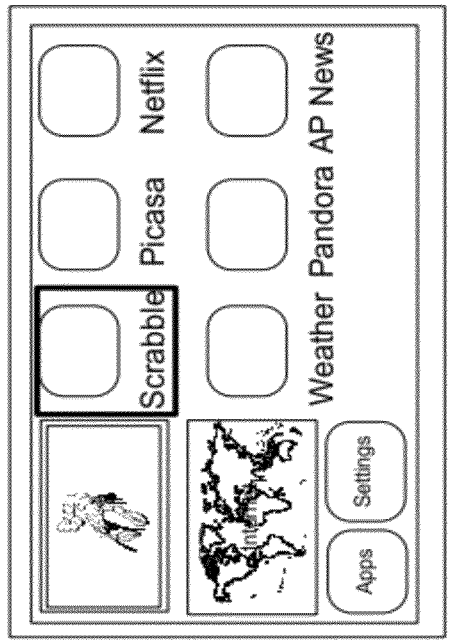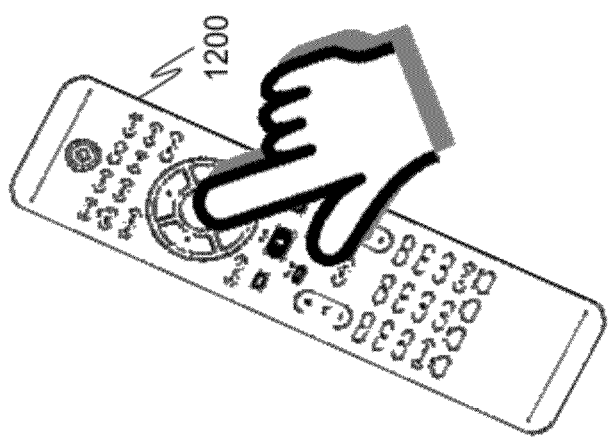
FIG. 12

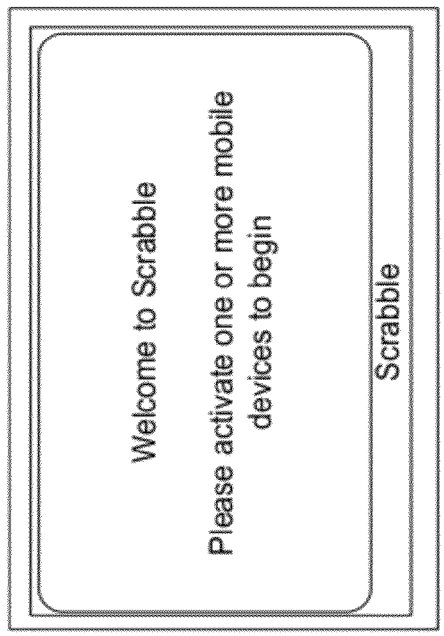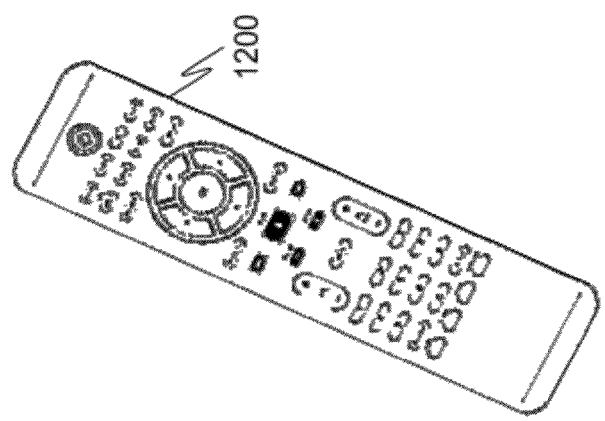
FIG. 13

MULTI-PLATFORM APPLICATION PLAYER

CROSS REFERENCE TO RELATED APPLICATIONS

This application claims the benefit of priority under 35 U.S.C. 119(e) to U.S. Provisional Patent Application No. 61/382,445, filed Sep. 13, 2010, which is incorporated herein by reference for all purposes.

BACKGROUND OF THE INVENTION

1. Field of the Invention

The present invention relates to computer science. More specifically the present invention relates to an application player capable of automatically loading and running other application players.

2. Description of the Related Art

In recent years, there has been a dramatic rise in the popularity of non-traditional computing devices. Specifically, for many years the term "computer" has implied either a desktop computer or a laptop computer. With the advancement of battery, processor, and display technologies, however, it is now feasible to have fully functioning computers embedded in devices that previously were used solely for other purposes (e.g., mobile phones, televisions, refrigerators, etc.). Part of this revolution has included enabling all of these non-traditional computing devices to connect to the Internet.

Each of these non-traditional Internet-enabled devices typically has an operating system, from which various applications can be loaded and executed. An example of such an operating system is Android™ (an operating system designed by Google™ of Mountain View, Calif., for use in multiple manufacturers' products).

In order to aid in application design, the concept of application players (or simply "app players") was introduced. An app player is a platform that can be executed by the operating system much in the way an application is executed. However, rather than running a single application, an app player is capable of running any number of different applications that have been specifically designed for it by developers. Typically these developers utilize a programming environment for the application player that allows them to easily create applications that are compatible with the app player platform. An example app player may be a game app player, where various games from different developers can be executed by the single app player. The developer may be provided with the game programming environment, which may include components such as standardized graphical interface objects (e.g., buttons, animation algorithms, etc.). The developer is then ensured that any user who obtains and runs the game app player can execute their developed game.

An app player is similar to, but is distinct from, a plug-in. A plug-in is a software component that extends the functionality of an application. No portion of the plug-in, however, can operate independently of the application to which it is being installed. An app player, on the other hand, has at least one component that can be run independently. Typically this component will be the interpreter. In that sense, the app player is more similar to a stand-alone application than it is to a plug-in.

Typically a user who wishes to run certain applications will download and install one or more app players of his or her choosing on his computing device. While this sort of paradigm may work well in simple environments, such as where the user has only a single non-traditional computing device (such as a mobile phone), it is now becoming more and more common for a user to have multiple non-traditional computing devices that are all connected to a network. A prime example is that televisions now are being shipped including computing capabilities that allow web surfing and other applications to be run from the television itself. A user may wish, for example, to run an application on a mobile phone that is currently installed on his television. This may include running the application as a whole, or could simply be an adjunct program to the version running on the television (for example, a remote control for the application on the television). To complicate matters, the television may be running on a different operating system than the mobile phone, and thus the app player required to run the application may not be readily apparent to the user. Furthermore, while some degree of user sophistication is often presumed (albeit many times incorrectly) in users of traditional computing devices, that same degree of user sophistication cannot be presumed in users of non-traditional computing devices. A user of a mobile phone and television combination will not have the same level of sophistication or patience for tracking down appropriate app players as a user of a desktop computer.

What is needed is a solution that permits interoperability of applications developed for different app players with the minimum of involvement on the part of the user.

SUMMARY OF THE INVENTION

In a first embodiment of the present invention, a method for operating a multi-platform application player on a device is provided, comprising: receiving an indication of a first application to run on the device; determining a platform required for the first application to run; identifying a first application player suitable for running an environment compatible with the determined platform, wherein the first application player is capable of running the first application as well as one or more other applications created for the determined platform; loading the first application player in the multi-platform application player; and running the first application in the first application player in the multi-platform application player on the device.

In a second embodiment of the present invention, an apparatus is provided comprising: a display; an interface; memory; and a multi-platform application player comprising: a player host having a plurality of installed application players, each of the application players executable to operate a platform from which applications can be executed; and a processor adapted to: operate the multi-platform application so that, when an application is run, a player source is queried to determine an application player needed to run the application and, if the determined application player is not already installed in the multi-platform application player, download and install the determined application player from an application source.

In a third embodiment of the present invention, a multi-platform application player is provided comprising: means for receiving an indication of a first application to install in the multi-platform application platform player; means for determining an application player required to run the first application; means for automatically downloading and installing the application player required to run the first application if it is not already installed in the multi-platform application player; and means for installing the first application so that it runs using a virtual platform produced by running of the application player required to run the first application.

In a fourth embodiment of the present invention, a program storage device readable by a machine tangibly embodying a program of instructions executable by the machine to perform a method for operating a multi-platform application player on a device is provided, the method comprising: receiving an indication of a first application to run on the device; determining a platform required for the first application to run; identifying a first application player suitable for running an environment compatible with the determined platform, wherein the first application player is capable of running the first application as well as one or more other applications created for the determined platform, wherein the first application player contains an application interpreter capable of running independently of any other program; and running the first application in the first application player in the multi-platform application player on the device.

BRIEF DESCRIPTION OF THE DRAWINGS

The present invention will be readily understood by the following detailed description in conjunction with the accompanying drawings, wherein like reference numerals designate like structural elements, and in which:

FIGS. 10-16 are examples of a sequence of loading a multi-user game in accordance with another embodiment of the present invention.

DETAILED DESCRIPTION OF THE INVENTION

Figure 1:
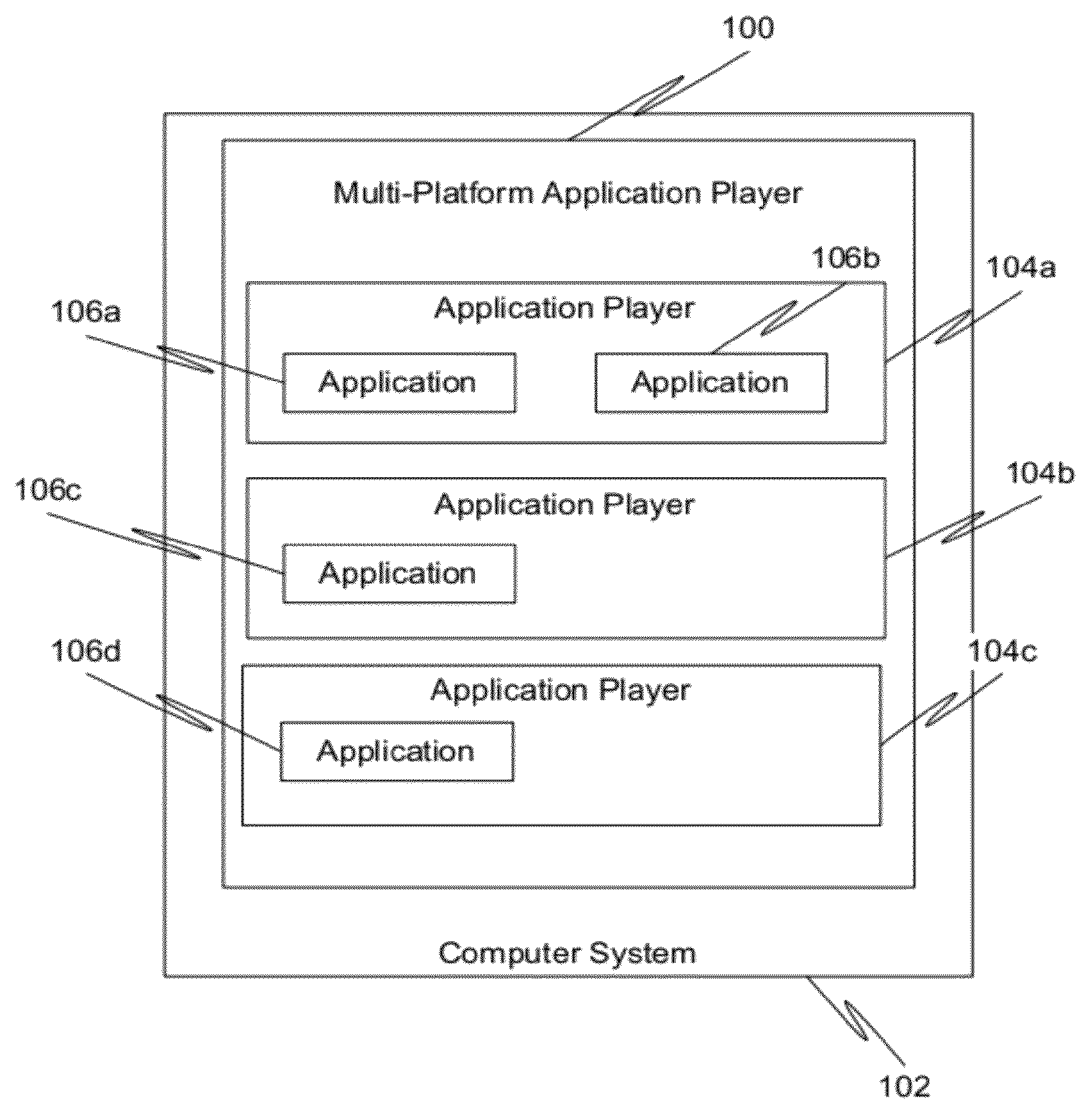
FIG. 1 is a block diagram illustrating a system in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

An embodiment of the present invention provides for a multi-platform application player. This multi-platform application player has the ability to automatically and transparently load other application players that are necessary to run installed applications. This minimizes or even eliminates the user's awareness of the fact that the application desired to be run is not natively supported by the operating system running on the desired device. In essence, an app-player player is provided that loads and runs multiple app players without the need for user intervention.

It should be noted that an application player is a computer program that operates a platform (or virtual platform) in which an application can be run. An application player has at least some portion that is executable independently of other program (i.e., "stand-alone"). In many cases this portion will be the application interpreter, although the present disclosure is not intended to be limited to such configurations. By maintaining at least some portion that is stand-alone, an application player can be differentiated with other computer programs or configurations that merely alter the capability of some other computer program to operate a particular platform. For example, a plug-in for a web browser modifies the web browser to be able to interpret particular types of applications. However, such a plug-in would not be considered an application player because it has no independently executable component—it requires the web browser to operate in order to perform all of its functionality.

FIG. 1 is a block diagram illustrating a system in accordance with an embodiment of the present invention. Generically speaking, a multi-platform application player 100 may be loaded on a computer system 102. As will be described more later, the computer system 102 may be any type of computer system or electronic device capable of information processing. The multi-platform application player 100 can load and execute multiple application players 104*a*, 104*b*, 104*c*, each of which can execute applications 106*a*, 106*b*, 106*c*, 106*d* designed to be compatible with the corresponding application player 104*a*, 104*b*, 104*c*. The applications 106*a*, 106*b*, 106*c*, 106*d* may be designed for a variety of different information processing environments and platforms, yet the multi-platform application player 100 allows all of them to be executed on the computer system 102 even though the computer system 102 may not natively support the application.

It should be noted that while in FIG. 1 each application player 104*a*, 104*b*, 104*c* is depicted as having at least one application, this condition is not necessary. Indeed, there may be various states of the multi-platform application player 100 where an application player is installed and ready to execute yet no application compatible with the application player is installed (or one that had been previously installed has since been deleted). Additionally, it is possible that an application will have been installed even though there is not yet a compatible application player installed yet. Such a condition is likely to be temporary as the present invention is designed to automatically locate and install compatible application players for these unassociated (also known as "orphan") applications. However, until such compatible application players are located and installed (or if no such compatible application player can be found), the unassociated application may still be contained within the multi-platform application player without an associated application player.

Figure 2:
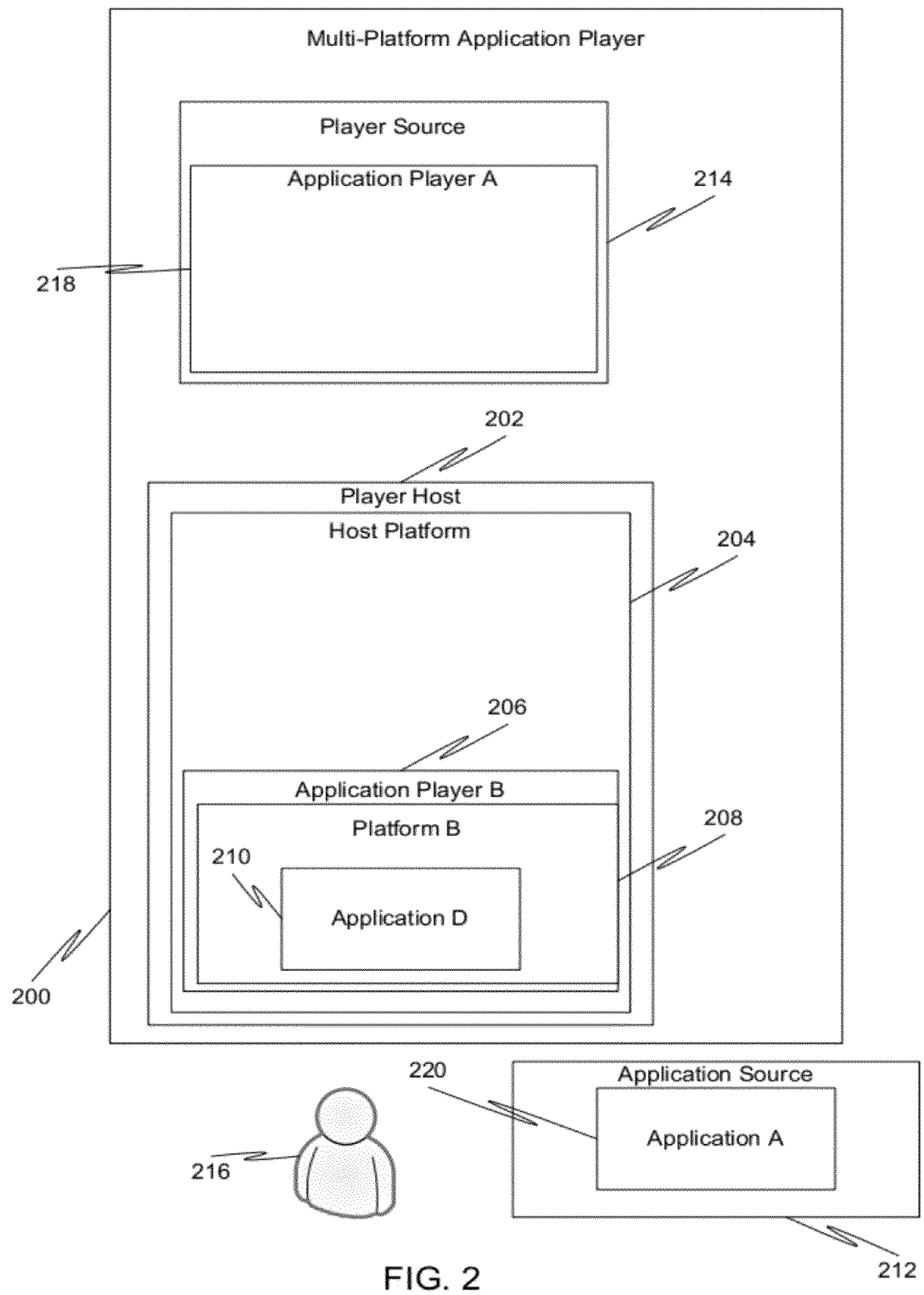
FIG. 2 is a more detailed block diagram of a system in accordance with an embodiment of the present invention.

FIG. 2 is a more detailed block diagram of a system in accordance with an embodiment of the present invention. As can be seen, the multi-platform application player 200 may contain a player host 202. The player host 202 is an application or application frame that can "host" players for a variety of different environments and platforms. The player host 202 includes a host platform 204. The host platform 204 is the environment in which the actual players will execute.

When an application is installed, the goal is to load the application in the host platform 204 along with an associated application player. Thus, one of the initial steps when loading the application may be to check the current host platform 204 to see if a compatible application player is already installed. Here, for example, player B 206 is already loaded in host platform 204. Player B 206 operates a particular platform environment, here platform B 208. Also depicted is application D 210, which is designed to run in platform B and thus is compatible with player B. When a new application is loaded, it will not be necessary to load an application player to run the new application if the new application is compatible with one of the previously loaded app players. Thus, in the example of FIG. 2, if the new application is compatible with platform B 208, then player B 206 will suffice to run the new application and no new application player needs to be loaded.

The application to be loaded may be retrieved from a number of different sources. An external application source 212 may be a repository from which the applications are chosen. While this application source 212 may be external to the multi-platform application player 200, it is not necessary that the application source 212 be located on a different physical device or even a different file system. Generally speaking, the application source 212 could be on a cloud service, a network resource, a location on a file system, a component embedded within the computer system, or any combination of these or other places. The only requirements for an application source are that it contain at least one application, that the user can make a selection of the application from the application source, and the application can be retrieved or loaded by the multi-platform application player 200.

When the user selects an application from an application source 212, the system can then query a player source 214 to determine which platform (and thus, ultimately, which application player) supports the correct platform or environment for the application. This may be performed in a number of different ways. In one embodiment, metadata contained in the application identifies compatible platforms or players. This metadata may either be explicit (for example, the metadata explicitly saying that "platform A is required" or "player A is required"), or implicit (for example, the metadata being in a particular format that is known to be compatible with a particular platform or player). In the latter case, the system may utilize additional components to aid in deducing the correct player to load. These additional components could be contained in the player source 214 itself, or may be located elsewhere. The location of these components is highly dependent on the architecture and location of the player source 214.

The player source 214 is a repository of players. This can be located in a variety of places. The player source 214 could be a network resource, a cloud service, a directory on a filesystem, or a component within the multi-platform application itself (as depicted in FIG. 2), or any combination thereof. The player source 214 need simply contain players, and allow the players to be enumerated. There should also be some sort of functionality used to aid in identifying appropriate application players for particular applications. This may be, for example, a mapping between metadata and corresponding application players, so that when the player source 214 is queried using metadata of an application to be installed (or recently installed), the player source 214 can compare this metadata to the metadata in the mapping to retrieve a corresponding application player. In some embodiments, however, the player source contains additional functionality that allows it to make more sophisticated analyses of which application player is necessary (for example, it may need to deduce which application player to use based on the metadata or other factors). Furthermore, additionally functionality is foreseen that allows the player source 214 to query another, external location (such as a server on the Internet) to help identify players that are beyond its ability to deduce, either because it is too complicated, or because the application and/or application player has been created or popularized subsequent to the time that the player source was installed or last updated. In other words, if the player source cannot itself identify an appropriate player, it can query another location for more help.

Figure 3:
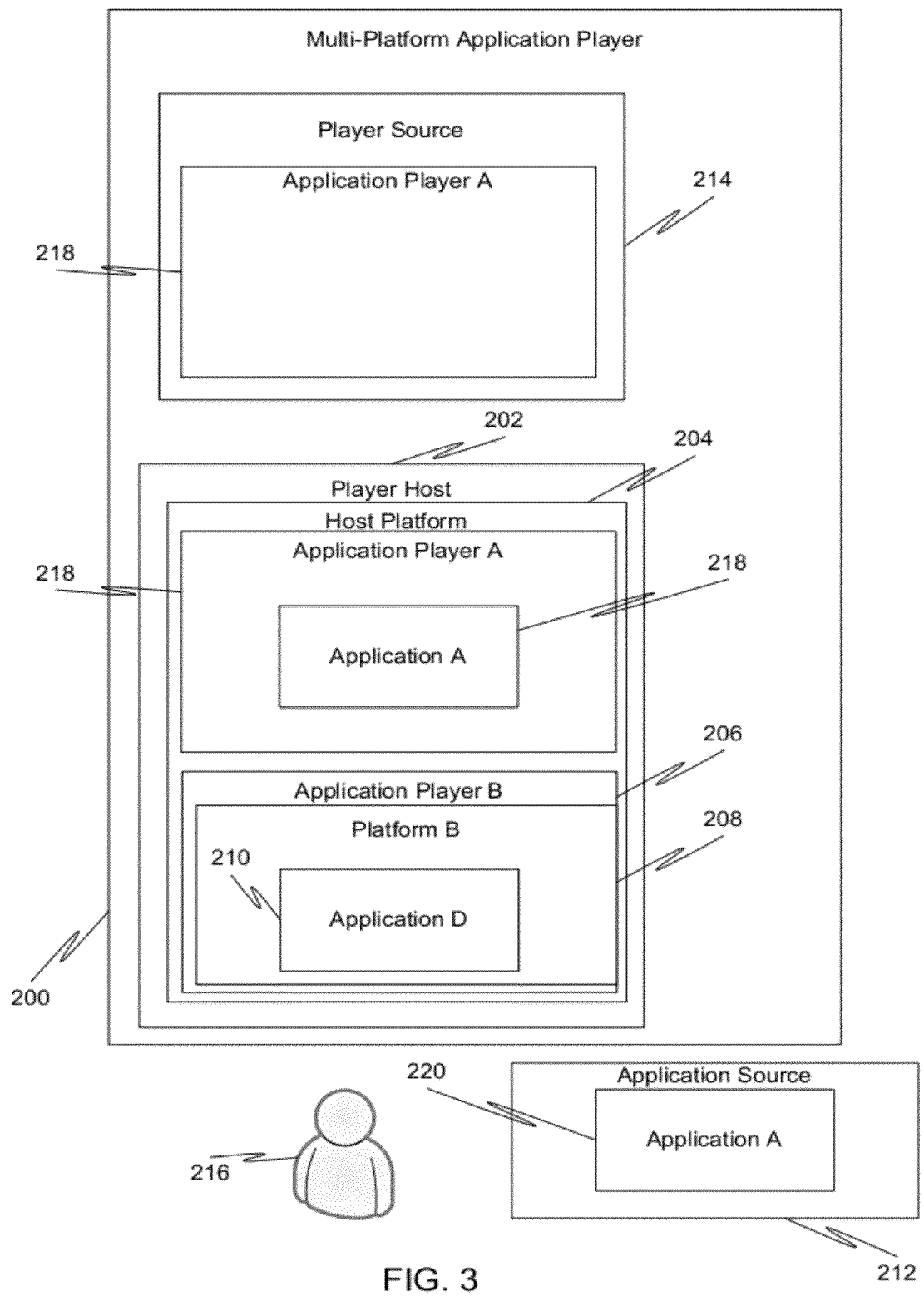
FIG. 3 is a block diagram illustrating the result of automatically loading player A into a host platform and loading application A into player A in accordance with an embodiment of the present invention.

When a user 216 selects an application from an application source 212, the multi-platform application player 200 may then retrieve the application. The system then queries the player source 214 to determine which player supports the correct platform or environment for that application, based on the metadata provided by the application source. In FIG. 2, the user has selected application A 220, and metadata associated with application A indicates that this application requires platform A. The system then queries player source 214, which identifies player A 218 as being compatible with platform A. At that point, the system can check to determine if player A 218 has already been loaded in host platform 204. In this example, it has not. Therefore, it then proceeds to automatically load player A 218 into host platform 204 and to also load application A 220 into player A 218. The result of this operation is depicted in FIG. 3, wherein host platform 204 now contains both player A 218 and player B 206, as well as application A 220 and application D 210.

Notably, the only interaction the user 216 had with this process as to identify application A 220 as a desired application to install. Subsequent to that selection, no additional communication with the user is necessary with regards to loading the application. Thus, the entire process of identifying and loading appropriate application players is completely transparent to the user. The player provides the platform and environment features that the application expects, and offers the appropriate experience to the user based on the host platform provided by the player host, without the user needing to know what has happened.

A user of a device implementing the multi-platform application player can access desired applications for a variety of different platforms from within the single multi-platform application player. Thus, not only is it not necessary for the user to be aware of how compatible application players are identified and loaded, the user need not even be aware that different application players are contained on his or her device. The user need simply execute the single multi-platform application player and run a desired application. Thus, for example, instead of having to run player A prior to running application A, or running player B prior to running application D, the user need simply run the multi-platform application player and then run either application A or D. The launching of an appropriate application player can be completely transparent to the user.

In one embodiment, the disclosed multi-platform application player, when paired with a plug-in system, provides additional types of applications that can be supported over time by installing new application players, thus increasing the variety of applications that will be playable by the single multi-platform application player.

It should be noted that it is expected that the multi-platform application player will be the only such multi-platform application player loaded on any one device. This is due to the fact that the very operation of the multi-platform application player makes any other multi-platform application player redundant. However, it is not strictly forbidden for multiple multi-platform application players to be used on a single device while still being consistent with the present invention.

Figure 4:
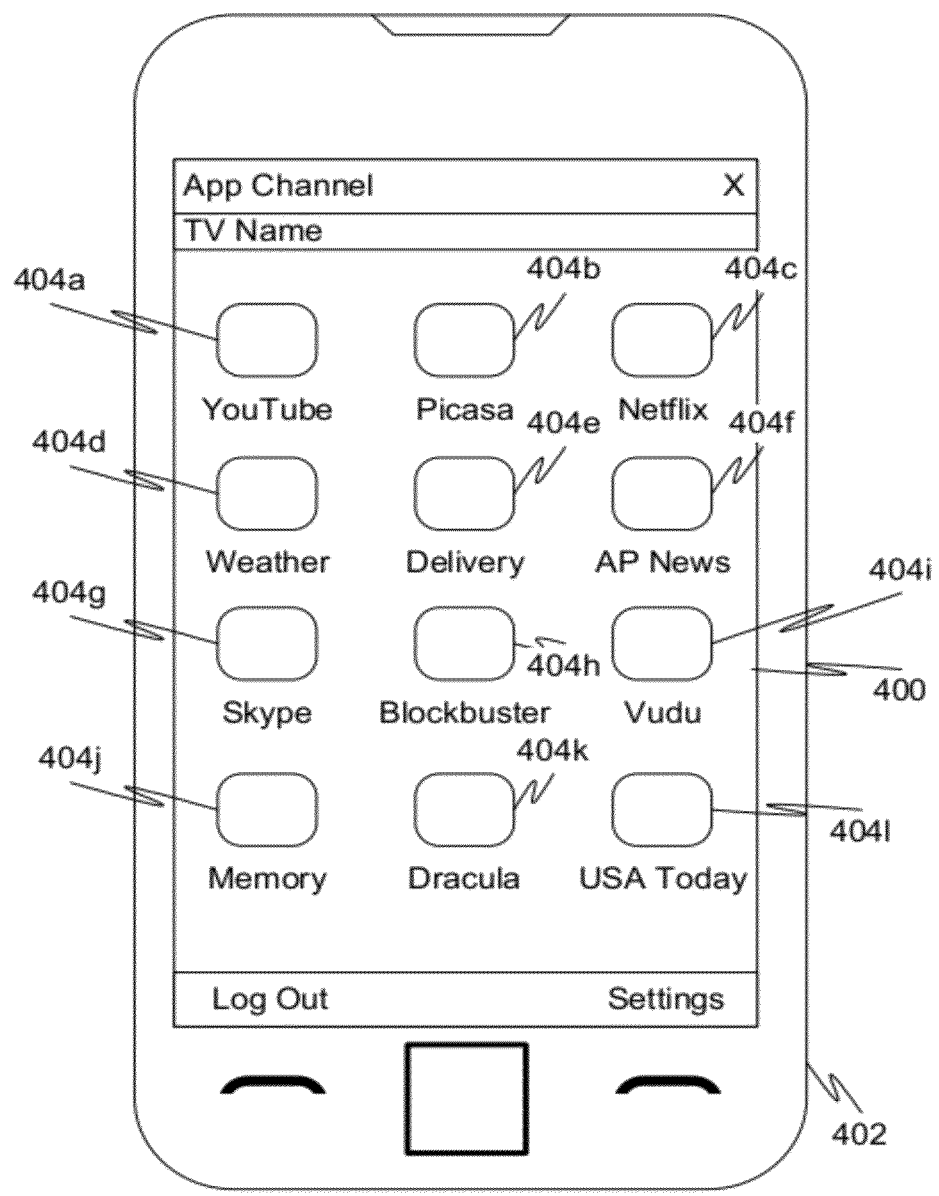
FIG. 4 is a diagram illustrating an example platform of the multi-platform application player implemented as an "AppChannel" system providing an application list on an electronic device such as a smart phone, personal digital assistant, portable media device, etc. in accordance with an embodiment of the present invention.

FIG. 4 is a diagram illustrating an example of the multi-platform application player implemented as an "AppChannel" system providing an application list on an electronic device such as a smart phone, personal digital assistant, portable media device, etc. in accordance with an embodiment of the present invention. The example AppChannel system in FIG. 4 displays a user interface 400 on the display screen of the device 402. The user interface 400 simply shows a list of all available applications 404a-404l, regardless of the platform or environment required for hosting. The applications within AppChannel can come from, for example, the device's internal storage, or a cloud service. The device, through the (non-pictured) multi-platform application player can support applications compatible with a number of different application platforms, such as, for example, Samsung Apps, Adobe Flash, and Yahoo Widgets, among others).

In addition to listing applications stored on the device currently used by the user, AppChannel can also depict applications that can be executed on or related to remote devices, such as a shared device in a home network. As an example, a shared device could be a home networked television set. An application that can control the television set can be automatically populated in the AppChannel on the user's smart phone when user is in the vicinity of the television set. Indeed, in this manner, it is not necessary even for the user to actively indicate the desire to load a particular application, they may simply be automatically loaded under appropriate circumstances. The application itself can be one that either executes on the remote device (the smart phone in this example, such as a remote control application for changing channels, volume, and other settings of the shared television set), or on the shared device (such as a caller ID application that continuously runs on the television unit and shows the caller ID of incoming calls on the television display). A number of applications are designed to only present a user interface on either the shared device or the remote device, while other applications are designed to present a user interface on both the shared device and the remote device (or multiple remote devices, for that matter). For example, a multi-user game may show a common game interface on the shared device screen and a personal view for each user playing the game on remote devices.

In one embodiment, the AppChannel system on the remote device provides a hosted environment that supports different applications within the system. For those applications that are designed to run on the shared device with a remote control device as an input device, a player source of the AppChannel system can include a "remote control player," which can provide a variety of different remote control screens based on the needs of a particular application. For example, certain applications may be designed for directional navigation and text input, and use a directional screen and a virtual keyboard interface, while other applications use video playback and a number of input interfaces with commands such as 'play', 'pause', and 'stop.'

Figure 5:
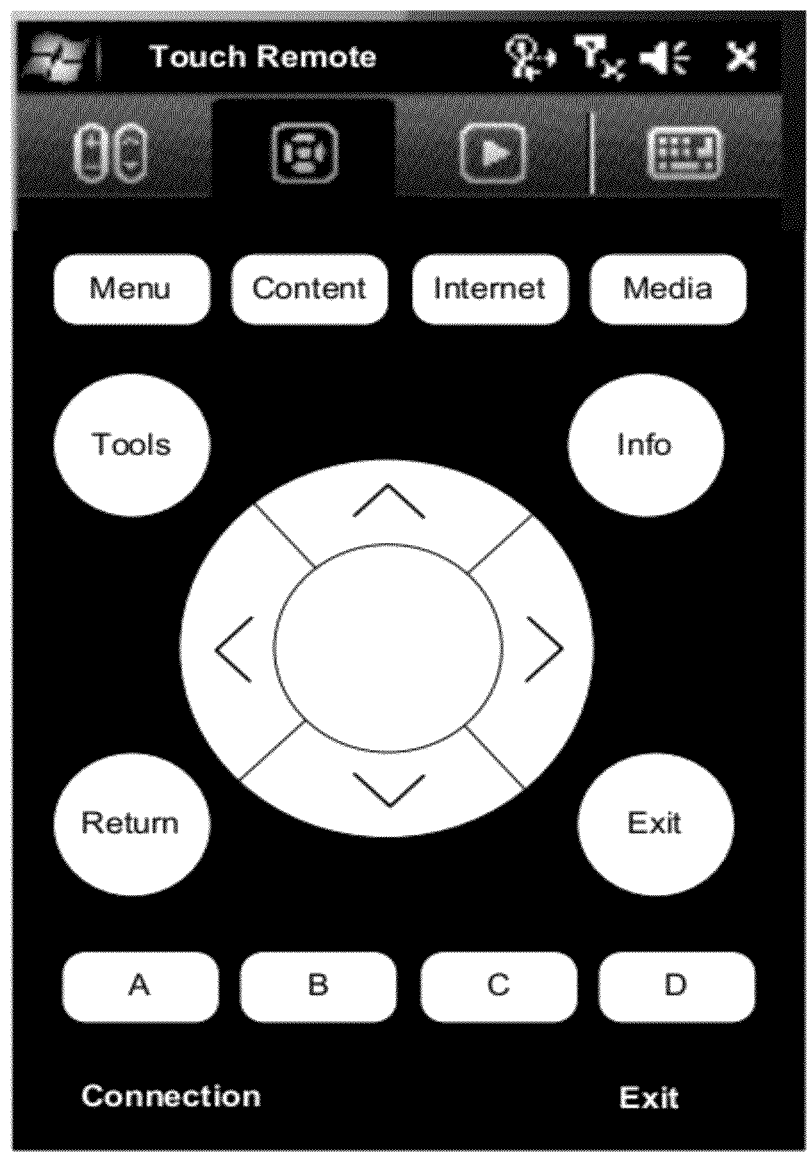
FIG. 5 is an example device having a remote control player with directional navigation in accordance with an embodiment of the present invention

FIG. 5 is an example device having a remote control player with directional navigation in accordance with an embodiment of the present invention. When an application expecting directional navigation using a remote control is loaded, the remote control player may automatically start and provide a directional-navigation user interface, without the user even being aware that the remote control player was launched (or even exists). In one example, a collection of screens shown on the remote control player includes the application (designed for a remote control platform).

For a multi-user game, the AppChannel system can retrieve a mobile player from the player source and then is able to host and play the mobile portion of the game application in a fashion that is compatible with the original standalone application. For multi-user widgets, the AppChannel system can retrieve a specific mobile player from a player source that offers the base platform and further includes a specific execution framework required for such multi-user widget applications (e.g., additional functionality such as support for web services and a mechanism for loading assets from a variety of sources).

In one example embodiment, there are 3 different components in a multi-user game system: a mobile player for games compatible with the one platform, a mobile player for games compatible with another platform, and a remote control player. The appropriate player can then be automatically determined and loaded when an application is installed or launched, based on the player source determining the required platform or environment.

In one embodiment, upon selecting the multi-platform application player, the user is simply taken to the list of applications, regardless of what underlying platform or player is required to host them. Then when the user selects the desired application, the user sees the expected user interface, without being aware of the hosting layer underneath that provides the experience. Indeed, users need not be aware of the platform, player, or category of the application, just the availability of running the application. Indeed, the user need not even be aware that the application exists prior to seeing it available for execution on his or her device.

In one embodiment, the decision as to which application player should be installed and/or loaded to run a particular application is not just based on information regarding the application itself, but is also based on hardware-specific information regarding the device on which the multi-platform application player is operating, or based on information regarding the operating system in which the multi-platform application player is operating. This information may be automatically retrieved from the hardware and/or operating system, and thus may also be performed transparently to the user. Hardware-specific information may include, but is not limited to, one or more of: processor, processor metrics, memory, screen size, screen resolution, update speed, and input method. Furthermore, additional information that may be relevant to which application player to use can also be relied upon in determining which application player to install and/or run. For example, there may be more than one compatible application player for a particular application. In such a case, the footprint (e.g., size in memory, processor requirements, etc.) of the corresponding application players may be compared and the "tie" may be broken by selecting the compatible application player having the smallest footprint.

In an example embodiment, the present invention is implemented on a device that interacts with an Internet-connected television. These Internet-connected televisions often need to offer features that match or exceed the consumer's experience with traditional connected devices, namely personal computers and smart phones, in order to stay competitive. While some television manufacturers have taken steps to attempt to bring the personal computer experience into consumer's living room, usually by offering access to popular on-line services such as stock quotes, weather, news, and social networks, this approach suffers from the fact that televisions are communal devices, attracting multiple members of a family or group to watch, often at the same time, while these Internet offerings only consider a single user. Moreover, the television's remote control limits the user's experience when compared to input devices used in personal computers, laptops, netbooks, and smart phones (keyboards, mice, track pads, touchscreens, etc.).

Figure 6:
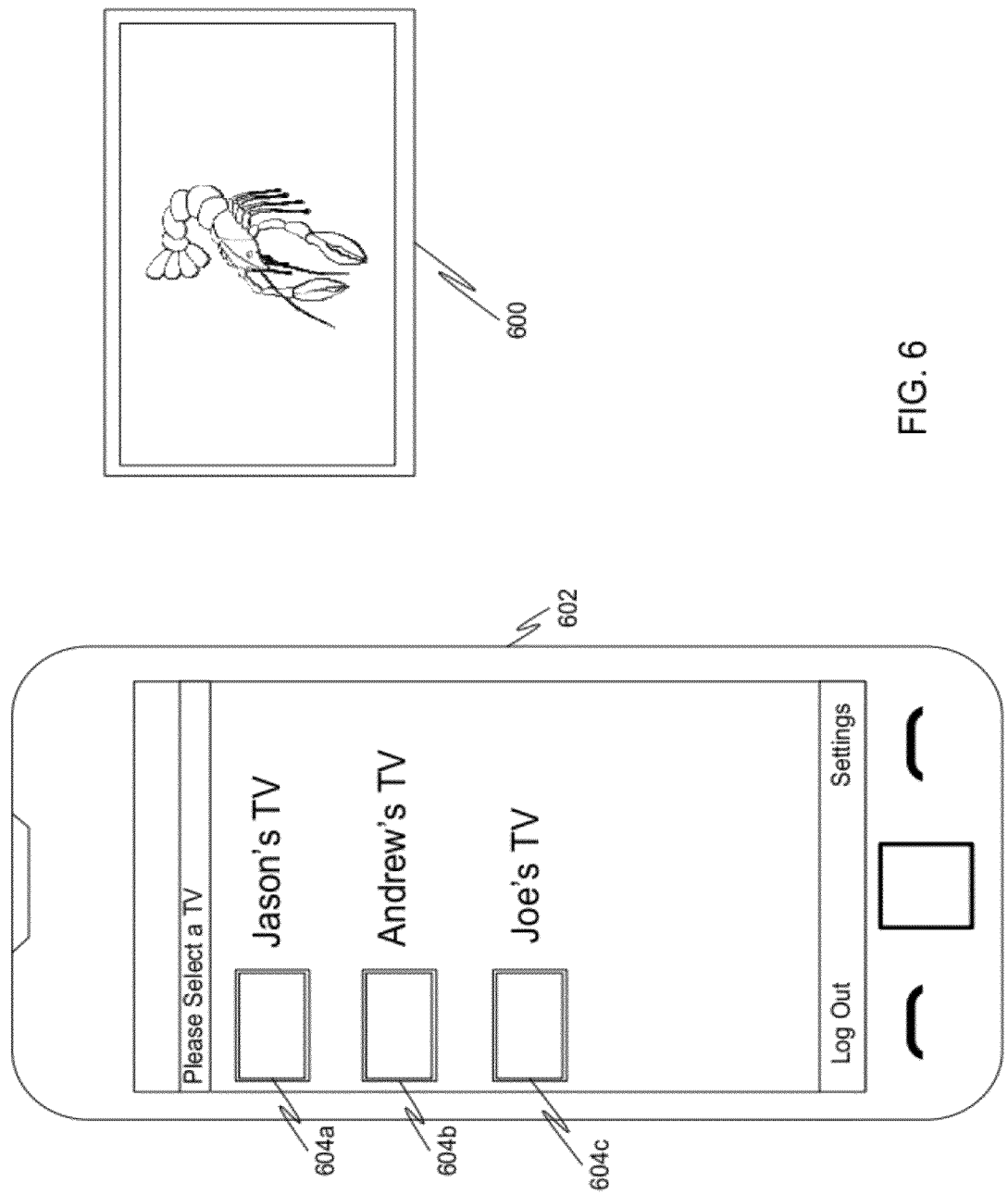
FIGS. 6-9 are examples of a sequence of loading a multi-user application using the multi-platform application player of the present invention.
Figure 7:
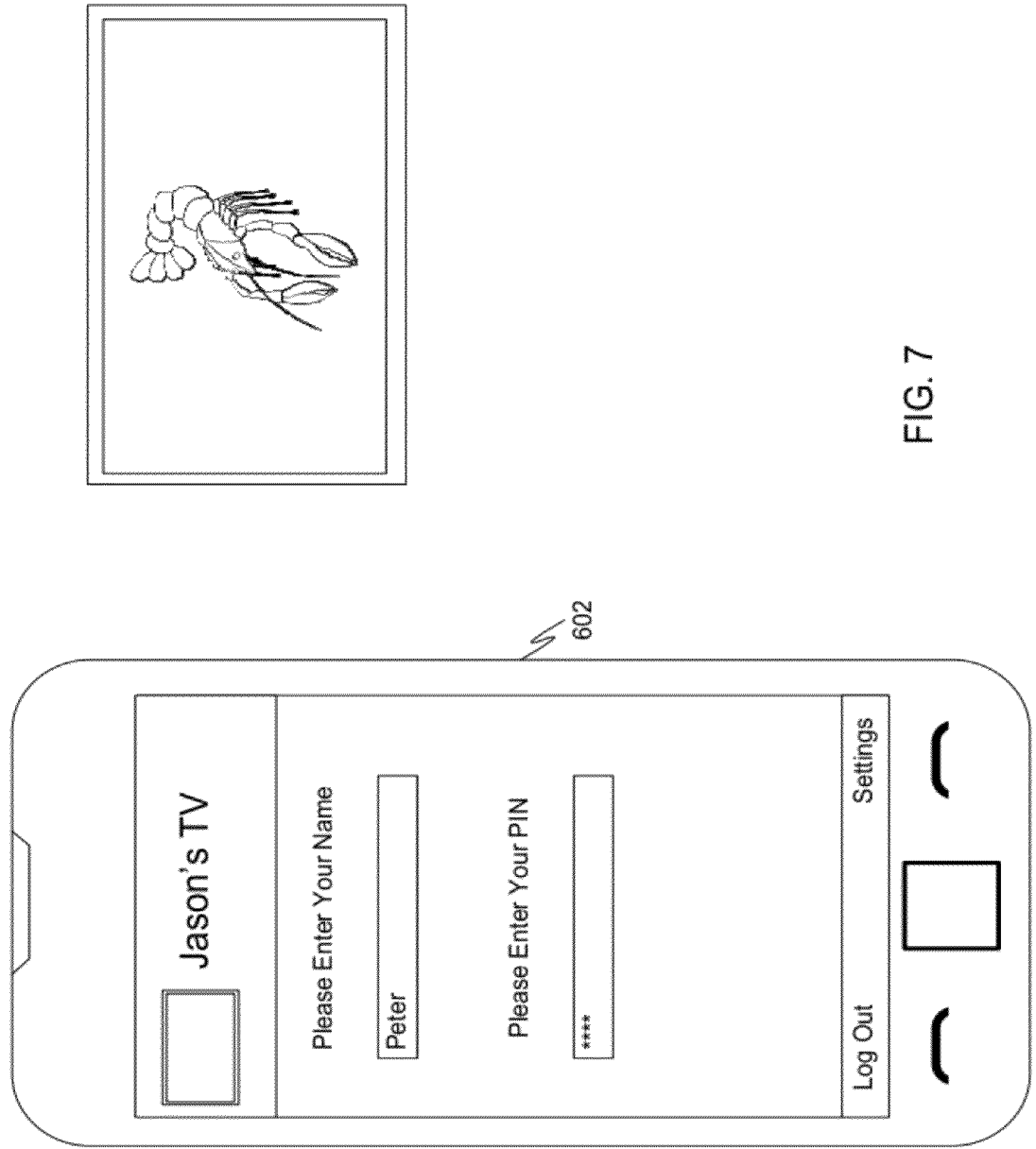

FIGS. 6-9 are examples of a sequence of loading a multi-user application using the multi-platform application player of the present invention. Referring to FIG. 6, it can be seen that the user is watching live television on television 600. The user also has a mobile device 602 with selections of multiple televisions 604a-604c within the range of mobile device 602. The user then can select the appropriate television 604a-604c from the list. Referring to FIG. 7, the user can then be prompted to enter their credentials in the mobile device 602.

Figure 8:
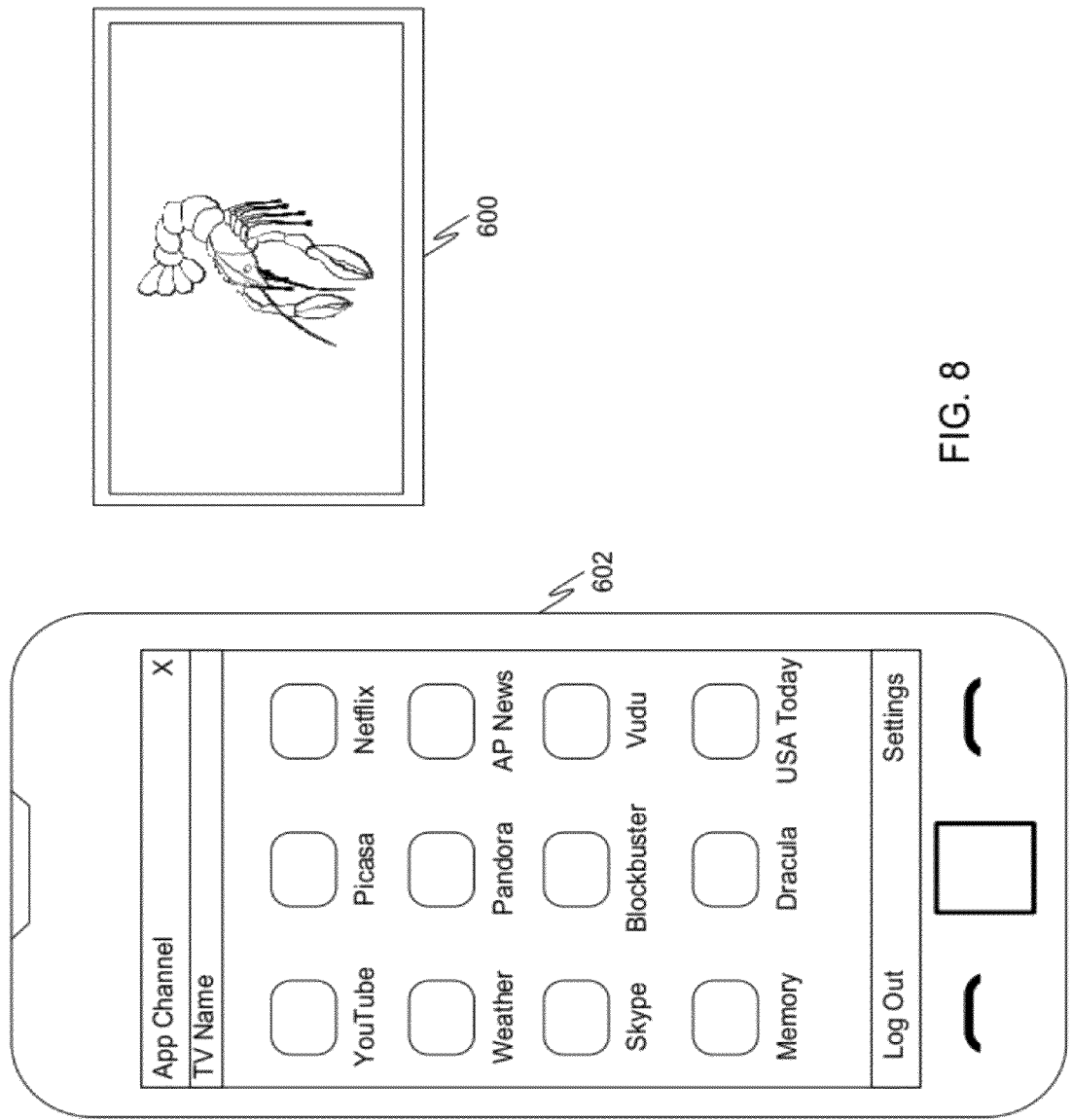
Figure 9:
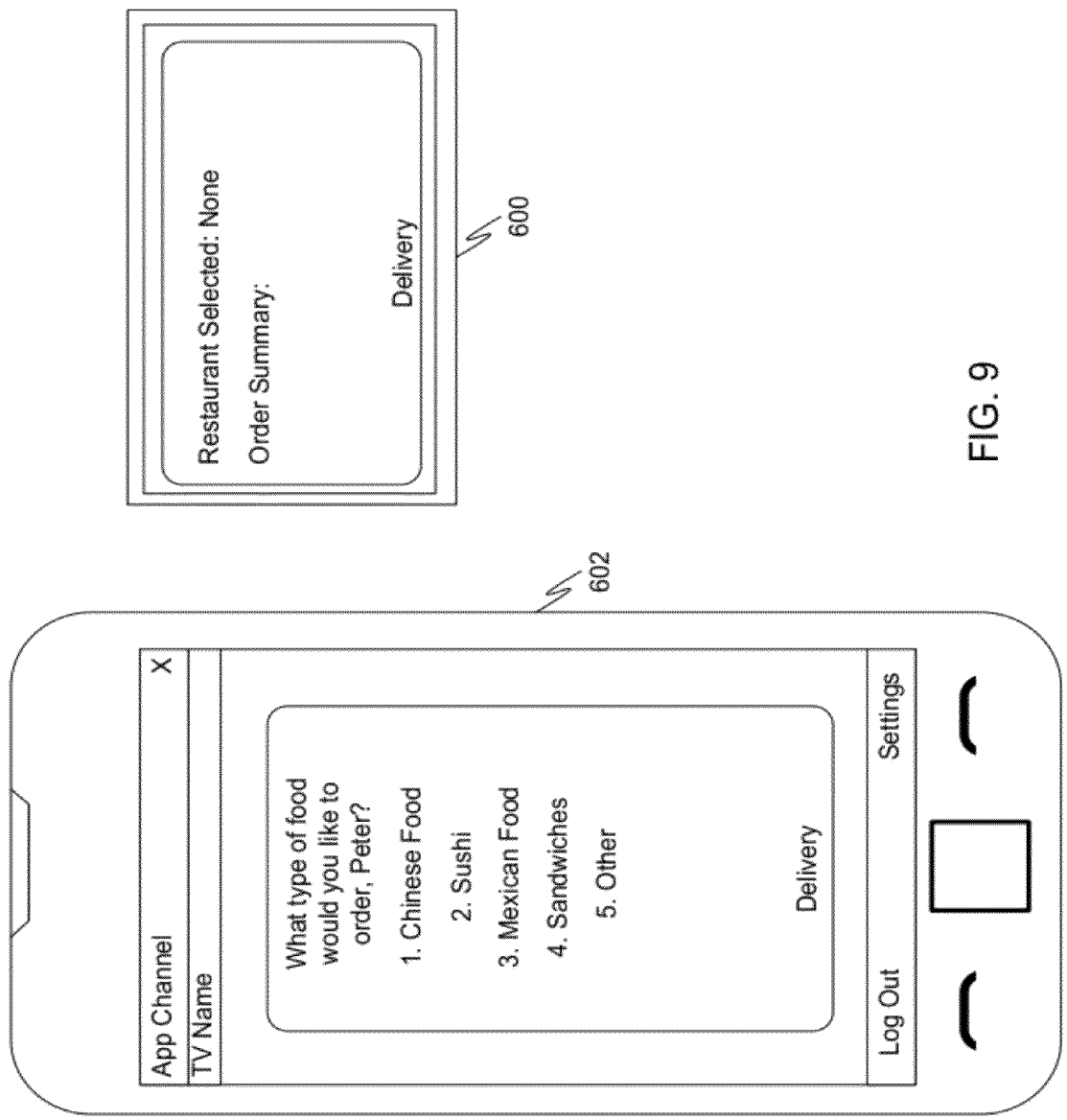

Referring to FIG. 8, the multi-platform application player (here, App Channel) is then launched on the mobile device 602. The television 600 is still showing live video. Referring to FIG. 9, the user selects an application and that application is then automatically launched on both the television 600 and the mobile device 602. This may include performing various behind-the scenes activities, such as identifying an appropriate application player for the selected application and downloading and installing that application player on the mobile device (and possibly the television as well). The application itself may also be downloaded and installed on the mobile device 602. Other users may then join the application in process using a similar procedure. In this case, the application is a restaurant meal ordering program that permits each user to view the menu on their own mobile device while selected menu items are displayed on the television. In this manner, users can collaborate as to what to order and then easily submit the order to the restaurant via their mobile devices and televisions.

Figure 10:
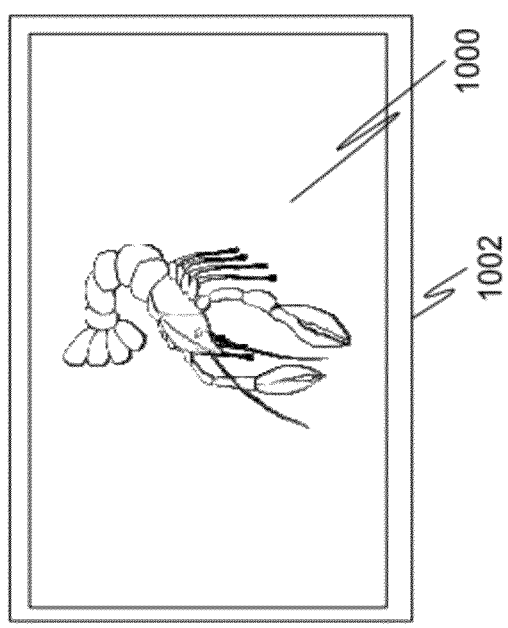

FIGS. 10-16 are examples of a sequence of loading a multi-user game in accordance with another embodiment of the present invention. Referring to FIG. 10, it can be seen that the user is watching live television 1000 on television 1002. Referring to FIG. 11, the user then presses an appropriate button on the television remote control to bring up Internet related services on the television 1002 with the live television 1000 being moved to the corner of the display. Referring to FIG. 12, the user then uses the remote control 1200 to navigate to the desired multi-user game. Referring to FIG. 13, the user then launches the game using the remote 1200, and waits for other users to join.

Figure 14:
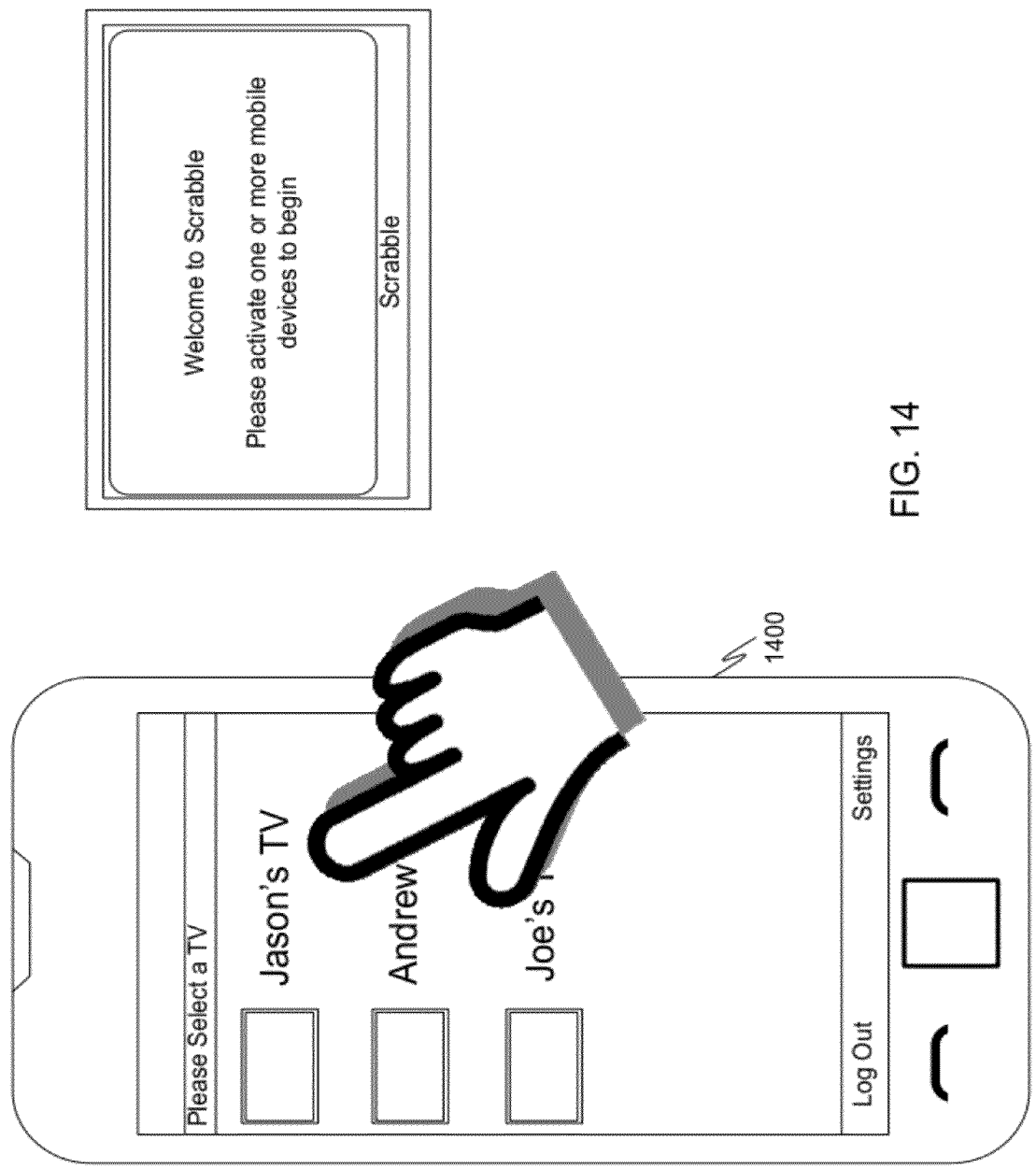
Figure 15:
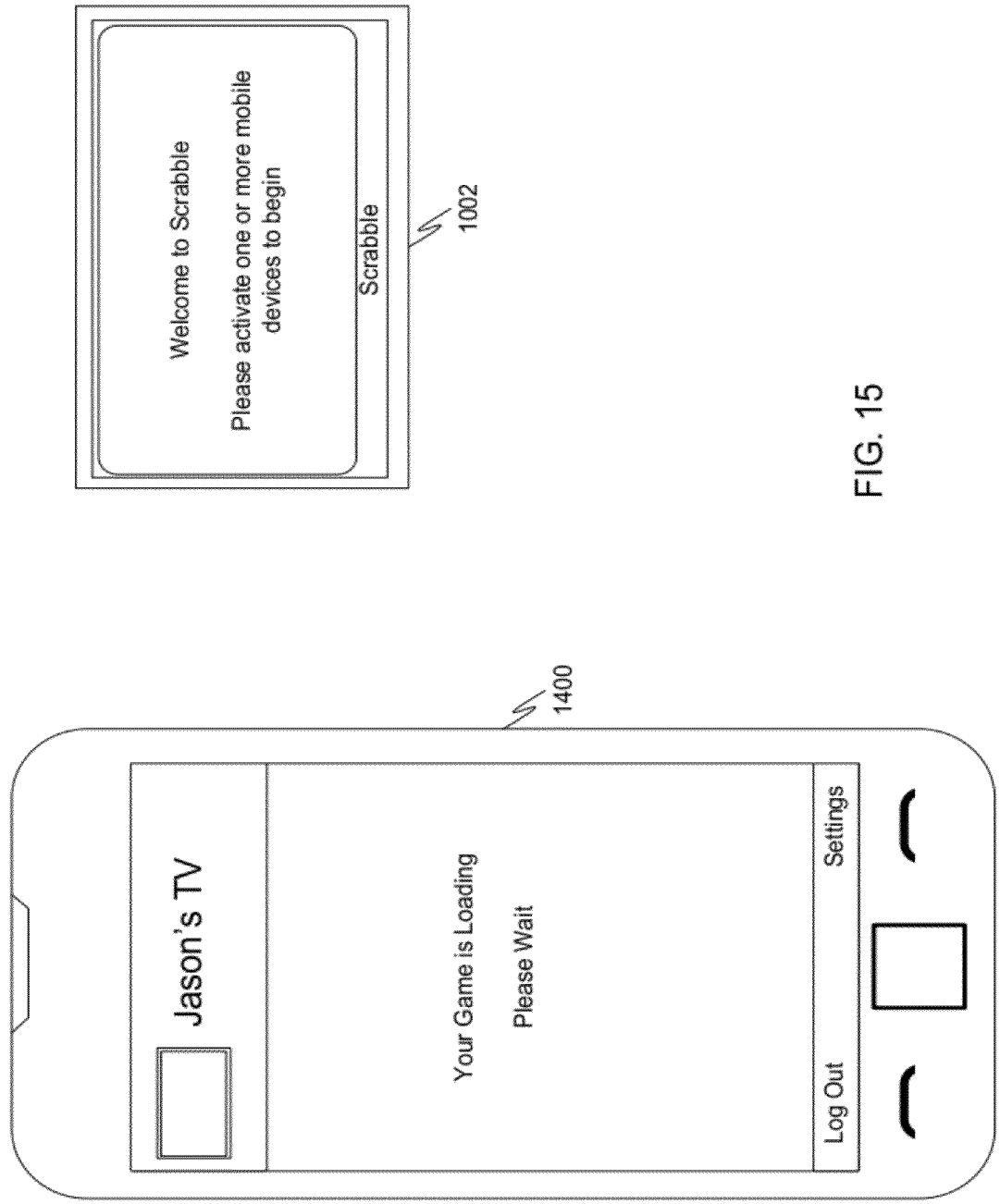
Figure 16:
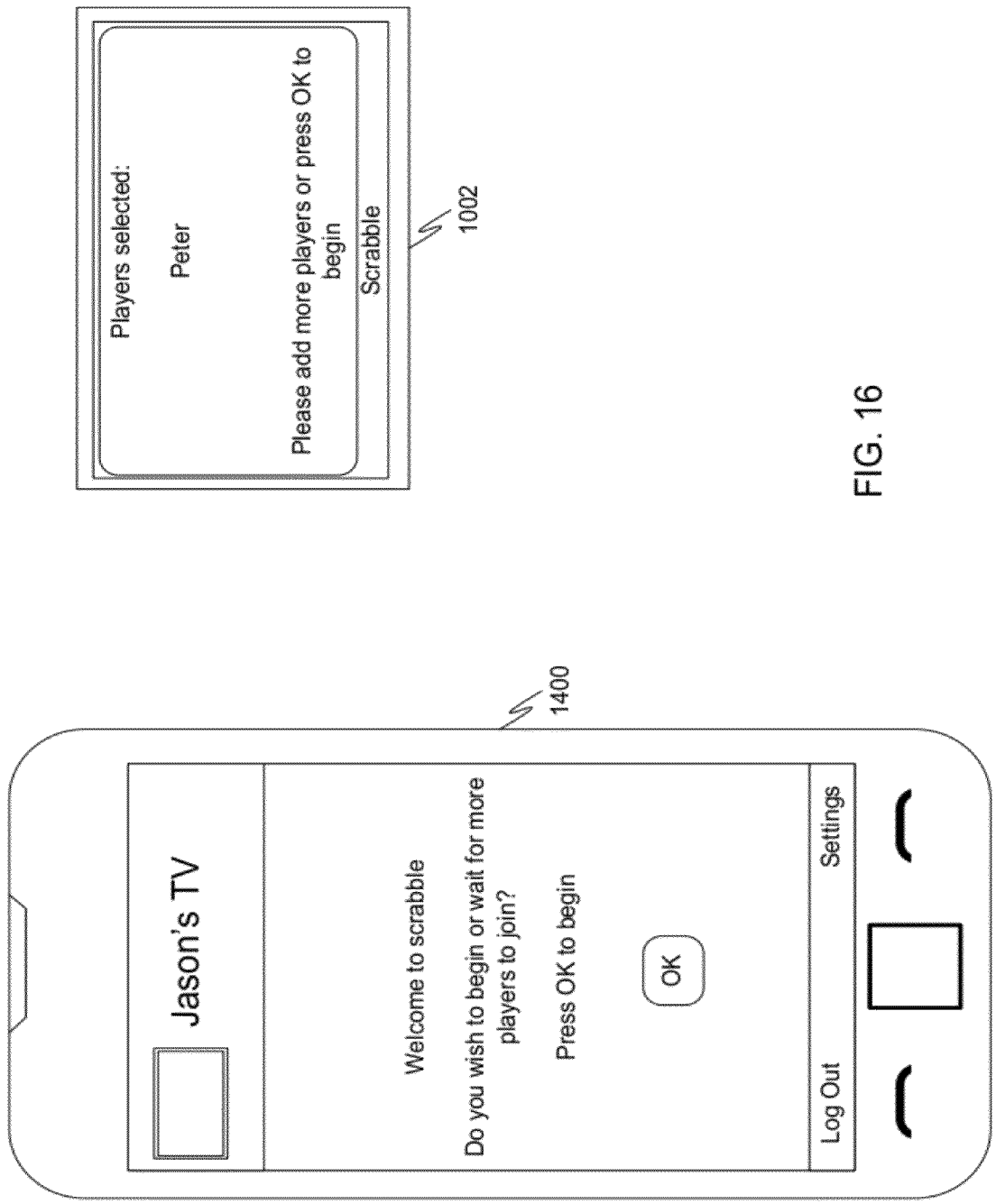

Referring to FIG. 14, the user then can select the appropriate television from a mobile device 1400. Referring to FIG. 15, the game assets may then be downloaded to the mobile device 1400 from the television 1002. Referring to FIG. 16, a multi-platform application player may then play the game, with each user controlling their own turns using their mobile device 1400 (and also seeing information on their mobile device 1400 that isn't to be shared with the other users, like the identity of tiles held by a player in a game of Scrabble). As with the example provided earlier, the multi-platform application player may perform a number of behind-the-scenes activities in order to facilitate the running of the game, including determining an appropriate application player to load based on metadata about the game received from the television, and loading the appropriate application player in a transparent manner.

One additional technological trend that the multi-platform application player of the present invention can capitalize on is in multi-screen systems. In the area of video games, the multi-player experience is quite old. Game consoles traditionally worked with multiple wired/wireless controllers to allow multiple players on a single game, however the video game display was a single screen. As described in the above examples, the television, as a prime focal point in many rooms, is a good candidate for use as a "communal display" with mobile devices providing secondary (and user-specific) displays for the game. However, the devices compatible with such multi-screen games are not limited to televisions. For example, one could conceive of a tablet computer being used as the communal display rather than a television, permitting the playing of the multi-player games in areas that have no television (other rooms, coffee shops, etc.).

Additionally, the present invention is able to continue the evolution of platforms to the ultimate goal of completely hardware independent platforms. While "computers" were in the past limited to desktop and laptop computers, the continued evolution of processors and other components has permitted virtually any device to be used as a computing device, from mobile phones to televisions to refrigerators. This only increases the need for hardware independence. The present invention can be capable with any number of different platforms and the networking standards between them. Browser-based platforms have grown in popularity in recent years as a means to platform independence, but richer applications are still browser specific and plug-in dependent. HTML5 is attempting to relieve some of these dependencies by providing native support for features such as video streaming, but it is still unlikely that a single standard will be utilized throughout the industry, thus there will still be a need for a multi-platform application player as described by the present disclosure.

One of ordinary skill in the art will recognize that the aforementioned example architectures, as well as any other architecture consistent with the multi-platform application player, can be implemented in a number of different ways, such as program instructions for execution by a processor, as software modules or microcode, as logic circuits, as ASICs, as firmware, in consumer electronic devices, in wireless devices, etc. Furthermore, embodiments of the multi-platform application player can take the form of entirely hardware embodiments.

Figure 17:
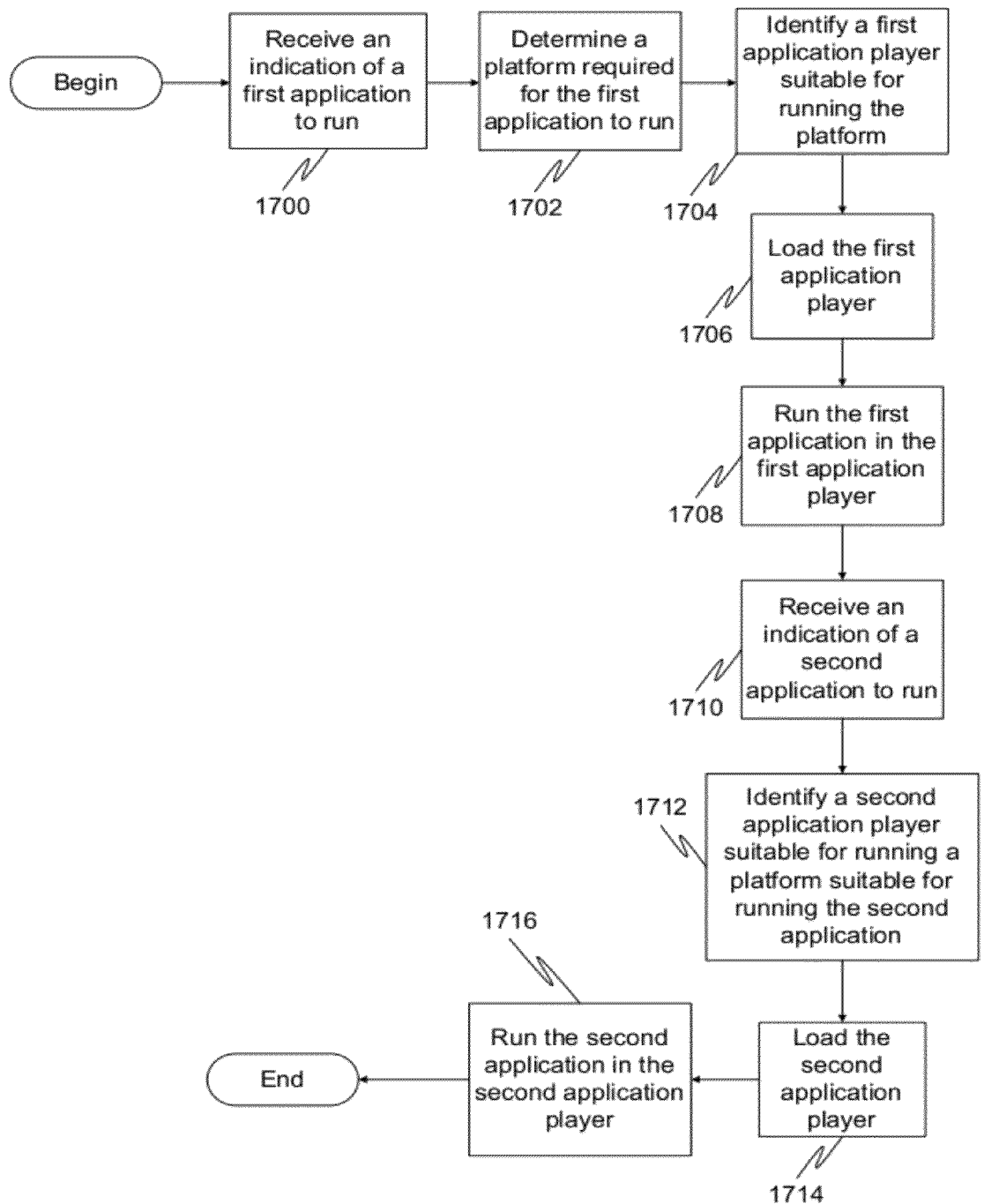
FIG. 17 is a flow diagram illustrating a method for operating a multi-platform application player on a device in accordance with an embodiment of the present invention.

FIG. 17 is a flow diagram illustrating a method for operating a multi-platform application player on a device in accordance with an embodiment of the present invention. At 1700, an indication of a first application to run on the device is received. This indication may come in many forms. For example, a graphical user interface may be provided to the user, and the user may select an available application from a list on the graphical user interface. This selection may operate as the indication of the first application to run. Alternatively, the indication may come from another source than the user. For example, another device (e.g., a parent's device) may signal to the device to install or run the particular application. In another example, the indication may come automatically from a computer system. For example, a system may be designed to automatically install applications that the user will be likely to enjoy, basing this decision on multiple factors, including user preferences, user profile information (e.g., age, sex, profession, etc), and actual program usage (e.g., the user operates a lot of music-related applications, so the system may be more likely to automatically install music-related applications).

At 1702, a platform required for the first application to run is determined. Again, this can be performed in a variety of different ways. In one embodiment, metadata for the first application can be examined. This metadata may either explicitly information the system of the platform required, or such information can be deduced from the metadata. At 1704, a first application player suitable for running an environment compatible with the determined platform is identified, wherein the first application player is capable of running the first application as well as one or more other applications created for the determined platform. It should be noted that in some embodiments, steps 1702 and 1704 are performed as a single step rather than two steps back to back. For example, the metadata for a particular application may actually specifically list the player that is required to be used to play the application, and thus the determination of what platform to run and the determination of what player to use actually occur at the same time. Additionally, one or both of these steps may include sending metadata related to the first application to a player source and receiving an identification of the first application player from the player source. This player source may be located on the device or on another device accessible over a network. At 1706, the first application player is loaded in the multi-platform application player. It should be noted that this step may not be required if the first application player is already loaded in the multi-platform application player. At 1708, the first application is run in the first application player in the multi-platform application player on the device.

At 1710, an indication of a second application to run on the device may be received, wherein the second application requires a platform other than the platform required for the first application to run. At 1712, a second application player suitable for running an environment compatible with a platform required for the second application to run may be identified. At 1714, the second application player may be loaded in the multi-platform application player. As with step 1706, this step may not be required if the first application player is already loaded in the multi-platform application player. At 1716, the second application may be run in the second application player in the multi-application player on the device.

In various embodiments, each of the steps above may be performed transparently to the user.

Figure 18:
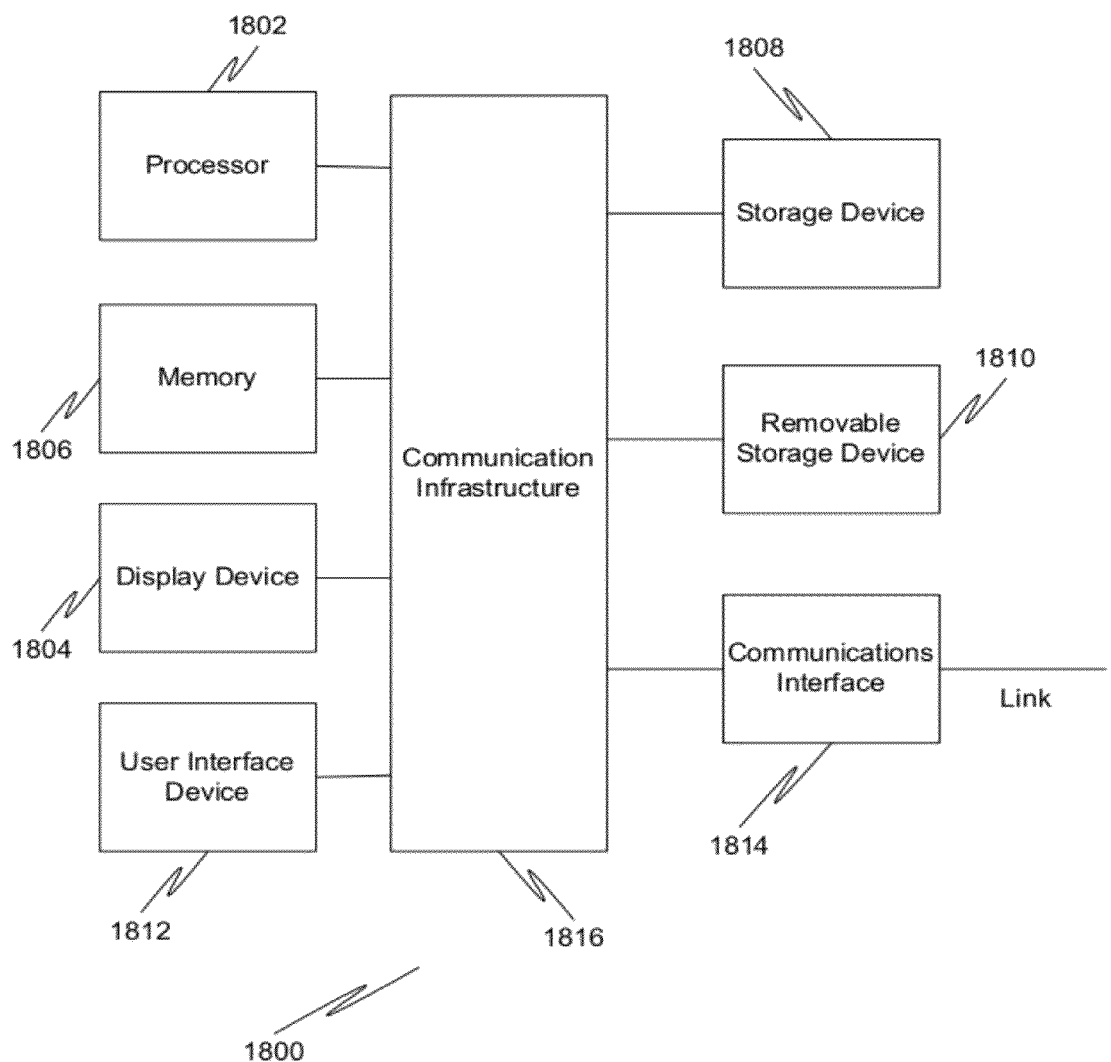
FIG. 18 is a high level block diagram showing an information processing system in accordance with an embodiment of the present invention.

FIG. 18 is a high level block diagram showing an information processing system in accordance with an embodiment of the present invention. The computer system 1800 is useful for implementing an embodiment of the disclosed multi-platform application player. The computer system 1800 includes one or more processors 1802, and further can include an electronic display device 1804 (for displaying graphics, text, and other data), a main memory 1806 (e.g., random access memory (RAM)), storage device 1808 (e.g., hard disk drive), removable storage device 1810 (e.g., optical disk drive), user interface devices 1812 (e.g., keyboards, touch screens, keypads, mice or other pointing devices, etc.), and a communication interface 1814 (e.g., wireless network interface). The communication interface 1814 allows software and data to be transferred between the computer system 100 and external devices via a link. The system may also include a communications infrastructure 1816 (e.g., a communications bus, cross-over bar, or network) to which the aforementioned devices/modules are connected.

Information transferred via communications interface 1814 may be in the form of signals such as electronic, electromagnetic, optical, or other signals capable of being received by communications interface 1814, via a communication link that carries signals and may be implemented using wire or cable, fiber optics, a phone line, a cellular phone link, a radio frequency link, and/or other communication channels. It should be noted that program storage devices, as may be used to describe storage devices containing executable computer code for operating various methods of the present invention, shall not be construed to cover transitory subject matter, such as carrier waves or signals. Program storage devices and computer readable medium are terms used generally to refer to media such as main memory, secondary memory, removable storage disks, hard disk drives, and other tangible storage devices or components.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for operating a multi-platform application player on a device, comprising:

receiving an indication of a first application to run on the device, wherein the indication is generated based on one or more of: a user action based on a list of available applications comprising local stored applications and applications available from a service, a signal from a module from another device, and a-signal generated based on user preferences;

determining a platform required for the first application to run based on an analysis, performed by the device, of application information associated with the first application;

identifying, by the device, a first application player suitable for running an environment compatible with the determined platform, wherein the first application player is capable of running the first application as well as one or more other applications created for the determined platform, wherein the first application player comprises an independently executable component;

retrieving the first application player from a player source based on the analysis, wherein the player source comprises a repository including a plurality of players;

loading, by the device, the first application player in the multi-platform application player; and running the first application in the first application player in the multi-platform application player on the device;

wherein the device executes a first process to launch the first application on the device and a second device executes a second process to launch the first application on the second device when the device is in the vicinity of the second device, wherein a particular application player for the first application is identified, downloaded and installed without user intervention, by the first process executed by the device, when the device determines that the device is in the vicinity of the second device.

2. The method of claim 1, further comprising:
receiving an indication of a second application to run on the device, wherein the second application requires a platform other than the platform required for the first application to run;
identifying, by the device, a second application player suitable for running an environment compatible with a platform required for the second application to run, wherein the second application player comprises an independently executable component;
retrieving the second application player from the player source based on an analysis of information associated with the second application;
loading, by the device, the second application player in the multi-platform application player; and
running the second application in the second application player in the multi-platform application player on the device at a same time that the first application runs in the first application player.

3. The method of claim 1, wherein the device executes without user interaction for performing the determining, the identifying, the loading, and the running-transparently to the user, whether the first application is local or external to the device, and the first application player comprises a platform that is executable by an operating system of the device and runs multiple different applications specifically designed for the first application player.

4. The method of claim 3, wherein the application information associated with the first application comprises metadata, wherein the determining and identifying include sending the metadata to a player source and receiving an identification of the first application player from the player source, wherein the metadata identifies compatible platforms or application players.

5. The method of claim 4, wherein the player source is located on the device.

6. The method of claim 4, wherein the player source is located on a device accessible over a network.

7. The method of claim 1, wherein:
the loading the first application player in the multi-platform player includes the device performing downloading of the first application player through a network connection and installing the first application player on the device without user interaction;
the identifying a first application player includes identifying a source for the first application player and downloading the first application player, independently of a user of the device.

8. The method of claim 7, wherein a user selects the first application from a list on a display of the device and is not aware of an exact source for the first application player when the device receives the indication to run the first application.

9. The method of claim 1, wherein a user of the device is not aware of an identity of the first application player when the device receives the indication to run the first application.

10. A device comprising:
a display;
an interface;
a memory; and
a multi-platform application player comprising:
a player host having a plurality of installed application players, each of the application players executable to operate as a platform from which applications are executable; and
a processor that:
receives an indication of a first application to run, wherein the indication is generated based on one or more of: a user action based on a list of available applications comprising local stored applications and applications available from a service, a signal from a module from another device, and a-signal generated based on user preferences;
determines a platform required for the first application to run based on an analysis, executed by the processor, of application information associated with the first application;
identifies a first application player suitable for running an environment compatible with the determined platform, wherein the first application player is capable of running the first application as well as one or more other applications created for the determined platform, wherein the first application player comprises an independently executable component;
retrieves the first application player from a player source based on the analysis, wherein the player source comprises a repository including a plurality of players;
loads the first application player in the multi-platform application player; and
runs the first application in the first application player in the multi-platform application player;
wherein the processor executes a first process to launch the first application on the device and a second device executes a second process to launch the first application on the second device when the device is in the vicinity of the second device, and
wherein a particular application player for the first application is identified, downloaded and installed without user intervention, by the first process executed by the device, when the device determines that the device is in the vicinity of the second device.

11. The device of claim 10, wherein the player source is located on a server.

12. The device of claim 10, wherein the player source is located on an external device.

13. The device of claim 12, wherein the device is a mobile device and the external device is a television.

14. The device of claim 10, wherein receiving an indication includes a graphical user interface designed to receive a user selection of an application to install.

15. The device of claim 10, wherein the application information associated with the first application comprises metadata, wherein determining includes accessing a table having a list of various pieces of metadata of applications and corresponding application players required to play the applications, wherein the metadata identifies compatible platforms or application players.

16. The device of claim 15, wherein determining includes communicating with a server over the Internet.

17. A non-transitory computer readable medium embodying a program of instructions executable by the machine to perform a method for operating a multi-platform application player on a device comprising:
receiving an indication of a first application to run on the device, wherein the indication is generated based on one or more of: a user action based on a list of available applications comprising local stored applications and applications available from a service, a signal from a module from another device, and a signal generated based on user preferences;

determining a platform required for the first application to run based on an analysis, performed by the device, of application information associated with the first application;

identifying, by the device, a first application player suitable for running an environment compatible with the determined platform, wherein the first application player is capable of running the first application as well as one or more other applications created for the determined platform, wherein the first application player contains an independently executable component that comprises an application interpreter that executes independently of any other program;

retrieving the first application player from a player source based on the analysis, wherein the player source comprises a repository including a plurality of players; and running the first application in the first application player in the multi-platform application player on the device;

wherein the device executes a first process to launch the first application on the device and a second device executes a second process to launch the first application on the second device when the device is in the vicinity of the second device, and wherein a particular application player for the first application is identified, downloaded and installed without user intervention, by the first process executed by the device, when the device determines that the device is in the vicinity of the second device.

18. The non-transitory computer readable medium of claim 17 further comprises:

receiving an indication of a second application to run on the device, wherein the second application requires a platform other than the platform required for the first application to run;

identifying, by the device, a second application player suitable for running an environment compatible with a platform required for the second application to run, wherein the second application player contains an independently executable component that comprises an application interpreter that executes independently of any other program;

retrieving the second application player from the player source based on an analysis of information associated with the second application;

running the second application in the second application player in the multi-platform application player on the device.

19. The non-transitory computer readable medium of claim 17 further comprises:

automatically retrieving hardware-specific information regarding a physical device on which the multi-platform application player is operating; and wherein the identifying is based at least partially on the retrieved hardware-specific information.

20. The non-transitory computer readable medium of claim 17 further comprises:

retrieving information by the device regarding an operating system running on a physical device on which the multi-platform application player is operating; and wherein the identifying is based at least partially on the retrieved operating system information, and wherein the first application player comprises a platform that is executable by an operating system of the device and runs multiple different applications specifically designed for the first application player.

21. The non-transitory computer readable medium of claim 17, wherein the device comprises a mobile phone.

22. The non-transitory computer readable medium of claim 17, wherein the device comprises a television.

23. The method of claim 1, wherein the indication of the first application to run on the device comprises a selection of the first application from an application source.

24. The method of claim 23, wherein the application source comprises an external application repository;

25. The method of claim 1, wherein identifying the first application player is based on application player memory, processor and screen information requirements.

26. The method of claim 1, wherein the user preferences comprises user personal information.

27. The method of claim 26, wherein the indication is automatically generated based on one or more applications related to type of program usage.

28. The method of claim 1, wherein the list of available applications includes all available applications regardless of platform or environment required for hosting.

* * * * *